US007768953B2

(12) United States Patent
Terry et al.

(10) Patent No.: US 7,768,953 B2
(45) Date of Patent: Aug. 3, 2010

(54) SYSTEM FOR IMPROVED POWER SAVINGS DURING FULL DTX MODE OF OPERATION IN THE DOWNLINK

(75) Inventors: Stephen E. Terry, Northport, NY (US); Robert A. DiFazio, Greenlawn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 1609 days.

(21) Appl. No.: 10/273,478

(22) Filed: Oct. 18, 2002

(65) Prior Publication Data
US 2003/0086381 A1    May 8, 2003

Related U.S. Application Data

(60) Provisional application No. 60/343,660, filed on Oct. 19, 2001.

(51) Int. Cl.
*G08C 17/00* (2006.01)
(52) U.S. Cl. .................. 370/311; 370/252; 370/324; 370/329; 370/348; 370/437; 455/502; 455/515; 455/522; 455/574
(58) Field of Classification Search .......... 370/345, 370/346, 347, 348
See application file for complete search history.

(56) References Cited

U.S. PATENT DOCUMENTS

| | | | |
|---|---|---|---|
| 5,541,976 A * | 7/1996 | Ghisler | 455/426.1 |
| 5,594,735 A | 1/1997 | Jokura | |
| 5,708,658 A | 1/1998 | Sugita | |
| 5,778,026 A | 7/1998 | Zak | |
| 6,038,238 A | 3/2000 | Jokinen et al. | |
| 6,137,789 A * | 10/2000 | Honkasalo | 370/342 |
| 6,240,066 B1 * | 5/2001 | Nagarajan et al. | 370/230 |
| 6,463,042 B1 | 10/2002 | Paatelma | |
| 6,654,922 B1 * | 11/2003 | Numminen et al. | 714/748 |
| 6,728,551 B2 * | 4/2004 | Chang | 455/522 |

(Continued)

FOREIGN PATENT DOCUMENTS

EP     0954113     11/1999

(Continued)

OTHER PUBLICATIONS

3GPP TS 25.224 V4.1.0 (Jun. 2001) $3^{rd}$ Generation Partnership Project; Technical Specification Group Radio Access Network; Physical Layer Procedures (TDD) (Release 4), Jun. 2001.

(Continued)

*Primary Examiner*—Vincent P Harper
*Assistant Examiner*—Mazda Sabouri
(74) *Attorney, Agent, or Firm*—Volpe & Koenig, P.C.

(57) ABSTRACT

A system and method that achieve power savings by turning off all or some of the baseband processing for codes and timeslots that have not been transmitted due to full DTX. When full DTX is detected by reception of a Special Burst (SB), the receiver is turned off for all timeslots and frames for the duration of the Special Burst Scheduling Period (SBSP). The transmitter schedules transmissions following any idle period to start on the boundary of the SBSP. The receiver determines the SBSP and if the transmitter initiates transmissions according to SBSP by reception of several initial full DTX cycles.

8 Claims, 6 Drawing Sheets

U.S. PATENT DOCUMENTS

| | | | |
|---|---|---|---|
| 6,850,509 B2 * | 2/2005 | Lee et al. | 370/336 |
| 7,027,419 B1 | 4/2006 | Hokao | |
| 7,068,623 B1 * | 6/2006 | Barany et al. | 370/329 |
| 2002/0086692 A1 * | 7/2002 | Chheda et al. | 455/522 |
| 2006/0183497 A1 * | 8/2006 | Paranchych et al. | 455/522 |

FOREIGN PATENT DOCUMENTS

| | | |
|---|---|---|
| JP | 8-163635 | 6/1996 |
| JP | 10-271040 | 10/1998 |
| JP | 10-336749 | 12/1998 |
| JP | 11-177575 | 7/1999 |
| JP | 2000-184433 | 6/2000 |
| JP | 2000-295119 | 10/2000 |
| TW | 306102 | 5/1997 |
| TW | 367680 | 8/1999 |
| WO | 99/10885 | 3/1999 |
| WO | 00/10359 | 2/2000 |

OTHER PUBLICATIONS

Third Generation Partnership Project, "Technical Group Specification Group Radio Access Network; Physical Layer Procedures (TDD)," 3GPP TS 25.224 v3.8.0 (Sep. 2001).

Third Generation Partnership Project, "Technical Group Specification Group Radio Access Network; Physical Layer Procedures (TDD) (Release 1999)," 3GPP TS 25.224 v3.11.0 (Sep. 2002).

Third Generation Partnership Project, "Technical Group Specification Group Radio Access Network; Physical Layer Procedures (TDD) (Release 4)," 3GPP TS 25.224 v4.1.0 (Jun. 2001).

Third Generation Partnership Project, "Technical Group Specification Group Radio Access Network; Physical Layer Procedures (TDD) (Release 4)," 3GPP TS 25.224 v4.2.0 (Sep. 2001).

Third Generation Partnership Project, "Technical Group Specification Group Radio Access Network; Physical Layer Procedures (TDD) (Release 4)," 3GPP TS 25.224 v4.6.0 (Sep. 2002).

Third Generation Partnership Project, "Technical Group Specification Group Radio Access Network; Physical Layer Procedures (TDD) (Release 5)," 3GPP TS 25.224 v5.2.0 (Sep. 2002).

Third Generation Partnership Project, "Technical Group Specification Group Radio Access Network; Multiplexing and channel coding (TDD) (Release 5)," 3GPP TS 25.222 V5.2.0 (Sep. 2002).

Third Generation Partnership Project, "Technical Group Specification Group Radio Access Network; Multiplexing and channel coding (TDD) (Release 4)," 3GPP TS 25.222 V4.5.0 (Sep. 2002).

Third Generation Partnership Project, "Technical Group Specification Group Radio Access Network; Multiplexing and channel coding (TDD) (Release 1999)," 3GPP TS 25.222 V3.10.0 (Sep. 2002).

Third Generation Partnership Project, "Technical Group Specification Group Radio Access Network; Multiplexing and channel coding (TDD) (Release 4)," 3GPP TS 25.222 V4.1.0 (Sep. 2001).

Third Generation Partnership Project, "Technical Group Specification Group Radio Access Network; Multiplexing and channel coding (TDD) (Release 1999)," 3GPP TS 25.222 V3.7.0 (Sep. 2001).

Third Generation Partnership Project, "Technical Group Specification Group Radio Access Network; Multiplexing and channel coding (TDD) (Release 4)," 3GPP TS 25.222 V4.2.0 (Dec. 2001).

Third Generation Partnership Project, "Technical Group Specification Group Radio Access Network; Physical Layer Procedures (TDD)," 3GPP TS 25.224 v3.8.0 (Sep. 2001).

Third Generation Partnership Project, "Technical Group Specification Group Radio Access Network; Physical Layer Procedures (TDD) (Release 1999)," 3GPP TS 25.224 v3.11.0 (Sep. 2002).

Third Generation Partnership Project, "Technical Group Specification Group Radio Access Network; Physical Layer Procedures (TDD) (Release 4)," 3GPP TS 25.224 v4.1.0 (Jun. 2001).

Third Generation Partnership Project, "Technical Group Specification Group Radio Access Network; Physical Layer Procedures (TDD) (Release 4)," 3GPP TS 25.224 v4.2.0 (Sep. 2001).

Third Generation Partnership Project, "Technical Group Specification Group Radio Access Network; Physical Layer Procedures (TDD) (Release 4)," 3GPP TS 25.224 v4.6.0 (Sep. 2002).

Third Generation Partnership Project, "Technical Group Specification Group Radio Access Network; Physical Layer Procedures (TDD) (Release 5)," 3GPP TS 25.224 v5.2.0 (Sep. 2002).

Third Generation Partnership Project, "Technical Group Specification Group Radio Access Network; Multiplexing and channel coding (TDD) (Release 5)," 3GPP TS 25.222 V5.2.0 (Sep. 2002).

Third Generation Partnership Project, "Technical Group Specification Group Radio Access Network; Multiplexing and channel coding (TDD) (Release 4)," 3GPP TS 25.222 V4.5.0 (Sep. 2002).

Third Generation Partnership Project, "Technical Group Specification Group Radio Access Network; Multiplexing and channel coding (TDD) (Release 1999)," 3GPP TS 25.222 V3.10.0 (Sep. 2002).

Third Generation Partnership Project, "Technical Group Specification Group Radio Access Network; Multiplexing and channel coding (TDD) (Release 4)," 3GPP TS 25.222 V4.1.0 (Sep. 2001).

Third Generation Partnership Project, "Technical Group Specification Group Radio Access Network; Multiplexing and channel coding (TDD) (Release 1999)," 3GPP TS 25.222 V3.7.0 (Sep. 2001).

Third Generation Partnership Project, "Technical Group Specification Group Radio Access Network; Multiplexing and channel coding (TDD) (Release 4)," 3GPP TS 25.222 V4.2.0 (Dec. 2001).

* cited by examiner

SYSTEM FOR IMPROVED POWER SAVINGS DURING FULL DTX MODE OF OPERATION IN THE DOWNLINK

CROSS REFERENCE TO RELATED APPLICATION(S)

This application claims priority from U.S. provisional application No. 60/343,660 filed on Oct. 19, 2001 which is incorporated by reference as if fully set forth.

FIELD OF THE INVENTION

The present invention relates to the field of wireless communications. Specifically, the present invention relates to providing power savings for high chip rate and low chip rate Time Division Duplex (TDD) type systems in the downlink during full discontinuous transmission (DTX) mode of operation.

BACKGROUND OF THE INVENTION

With a Third Generation Partnership Project (3GPP) Time Division Duplex (TDD) system, time is partitioned into transmission time intervals (TTIs) that are subdivided into frames, which are further subdivided into timeslots. A TTI is defined as one or more radio frames. Specifically, a radio frame is 10 ms; and a TTI may be 10, 20, 40 or 80 ms. The low chip rate TDD divides each frame into two subframes. The subframes are then divided into timeslots. A Coded Composite Transport Channel (CCTrCH) comprises one or more Transport Channels (TrCHs). A CCTrCH is mapped into a collection of one or more sets of timeslots and codes.

When the maximum data size of a CCTrCH is transmitted, all allocated codes and timeslots are used in the TTI. The actual number of codes and timeslots that are transmitted during a TTI are signaled to the receiver via a Transport Format Combination Index (TFCI). Codes and timeslots are allocated according to a set of rules known to both the transmitter and receiver, so once the number of codes and timeslots are known to the receiver by decoding the TFCI, it also knows which codes were transmitted in each timeslot.

A 3GPP TDD system includes support for discontinuous transmission (DTX) of radio frames when the total bit rate of a CCTrCH is less than the total bit rate of the codes and timeslots allocated to the CCTrCH within a TTI. The coding and multiplexing function in a TDD transmitter maps data onto codes and timeslots.

DTX is applied separately to each CCTrCH. When a CCTrCH is in DTX, some or all of the codes and timeslots allocated to the CCTrCH are not transmitted. DTX falls into two categories referred to as partial DTX and full DTX. During partial DTX, a CCTrCH is active but less than the maximum number of codes and timeslots are filled with data, and some codes and timeslots are not transmitted within the TTI. During full DTX, no data is provided to a CCTrCH by upper protocol layers and there is no data at all to transmit within a TTI. A CCTrCH may comprise multiple TrCHs that have different TTIs. In that case, the transmitted codes may change during each interval equal to the shortest TTI among the TTIs for all TrCHs in the CCTrCH. Throughout this document, references to the TTI will mean the shortest TTI among all the TrCHs in the CCTrCH. Since the present invention is directed to full DTX, only full DTX will be described hereinafter.

During full DTX, special bursts (SBs) are transmitted. Each SB is identified by a 0-valued TFCI in the first code of the first timeslot allocated to the CCTrCH. The first SB indicates the start of full DTX. Subsequent SBs are transmitted periodically every Special Burst Scheduling Parameter (SBSP) frame. The subsequent SBs provide a mechanism for the receiver to determine that the CCTrCH is still active, and prevent the receiver from declaring out-of-sync. Full DTX ends when upper protocol layers provide data.

In the 3GPP standard, the MAC entity provides data to the physical layer for transmission. The physical layer generates the SBs, indicating full DTX, whenever the MAC fails to provide any data for transmission. The physical layer ends full DTX reinitiates transmission as soon as the MAC provides data.

The SBSP is known to the transmitter, but not the UE. Hence during full DTX, the UE must process many frames on the possibility that an SB was transmitted, even though SBs are only transmitted once every SBSP frames. Further, the transmitter reinitiates data transmission as soon as data is available from higher layers, and does not synchronize the start of the data transmission with the beginning or end of a sequence of SBSP frames that started with an SB transmission. Hence, the UE must process many frames on the possibility that data transmission has started, even though a CCTrCH may still be in full DTX. Each time the UE turns on to process a frame and look for data or SBs, it uses power. Hence significant power savings for a mobile can be achieved by avoiding the need to turn on during frames when neither an SB nor data is transmitted.

SUMMARY OF THE INVENTION

The present invention achieves power savings by turning off all or some of the baseband processing for codes and timeslots that have not been transmitted due to full DTX. When full DTX is detected by reception of a Special Burst (SB), the receiver is turned off for all timeslots and frames for the remaining duration of the Special Burst Scheduling Period (SBSP) frames. The transmitter schedules transmissions following any idle period to start on the boundary of the SBSP. The receiver determines the SBSP and if the transmitter initiates transmissions according to SBSP by reception of several initial full DTX cycles.

DETAILED DESCRIPTION OF THE PREFERRED EMBODIMENTS

Figure 1:
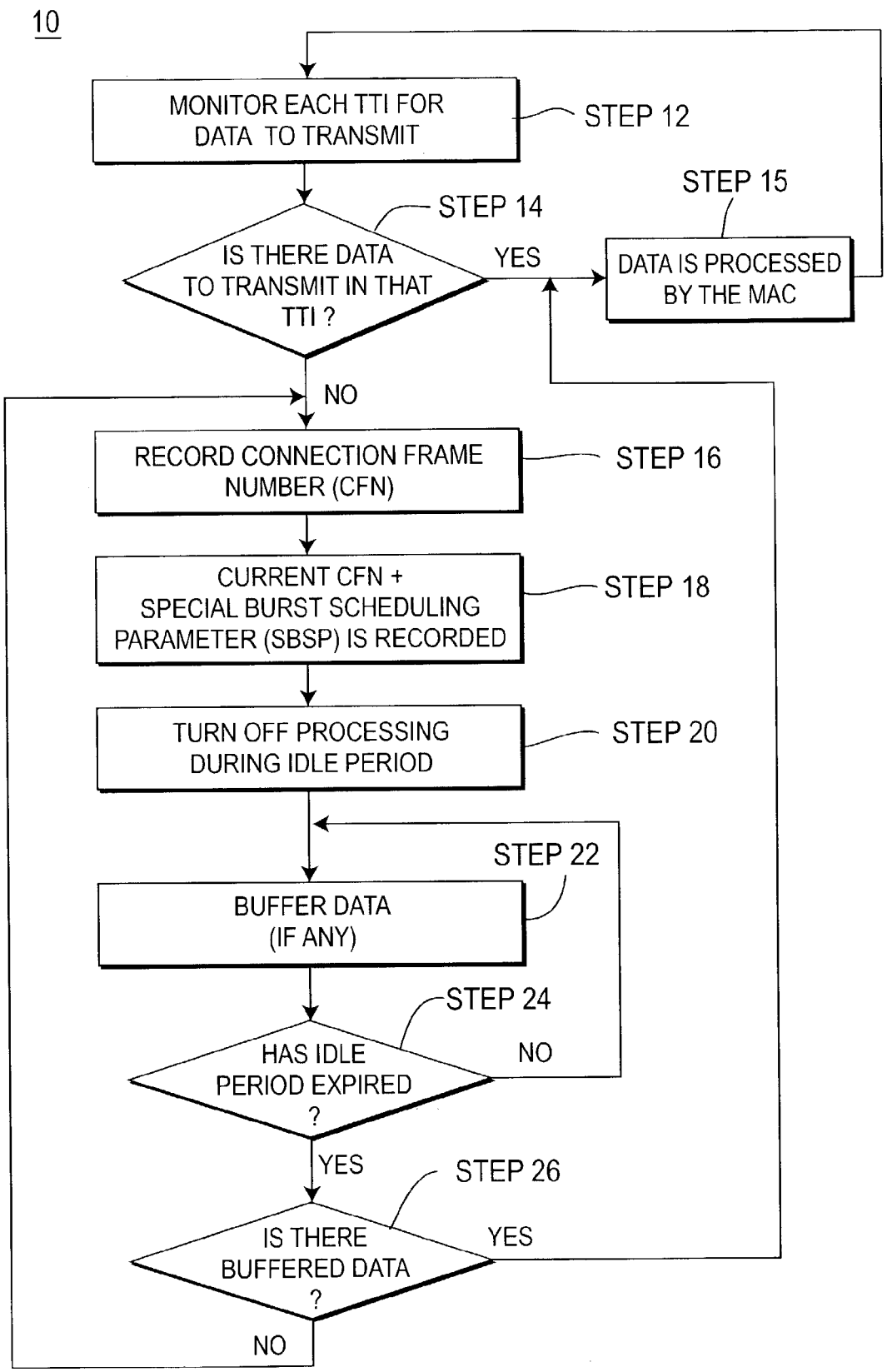
FIG. 1 is a flow diagram of a procedure for the MAC to restrict the start of data transmission to frames synchronized to the transmission timing of SBs.

The present invention will be described with reference to the drawing figures wherein like numerals represent like elements throughout. The present invention is applicable to full DTX in the downlink (DL); that is, the link between the Node B and the User Equipment (UE). In one embodiment of the invention, UTRAN MAC is aware of the frame in which the SB was sent and is also aware of the SBSP. Accordingly, following an idle period, the UTRAN MAC restricts transmissions when data is started again to only SBSP frame boundaries.

Referring to FIG. 1, a procedure 10 implemented by a UTRAN MAC is shown. The procedure 10 commences with the UTRAN MAC transmitter monitoring each TTI for data to transmit (step 12). The UTRAN MAC then determines whether there is data to transmit (step 14). If so, the data is processed for transmission by the MAC (step 15) and the next TTI the procedure 10 is started again. However, if it is determined that data is not being transmitted (step 14) in that TTI, the connection frame number (CFN) of the start of that TTI is recorded (step 16) and a transmission scheduling idle period is set (step 18).

The UTRAN MAC schedules all transmissions and therefore is aware of the CFN that corresponds to the first TTI that contains no data for transmission. This radio frame is the start of full DTX and will contain the SB. An idle period is the duration of the SBSP during which no data is processed for transmission by the UTRAN MAC. For example, if the UTRAN MAC transmitter has detected that frame 106 is the first frame of a TTI that no data is transmitted and thus DTX is entered, and the SB is transmitted in frame 106, if the SBSP is equal to 8 (i.e. 8 radio frames) then the transmission scheduling idle period will be set to end at frame 113.

Accordingly, at step 20, the processing of data is turned off and all data, if any, is held at the radio link controller (RLC) (step 22); (i.e. buffered). It is then determined whether the idle period has expired (step 24). If not, buffering of the data (step 22) continues. If the idle period has expired as determined by the current CFN being equal to the CFN that the idle period started plus the SBSP at step 18, it is then determined whether there is any buffered data (step 26). If so, data is processed by the MAC (step 15). If not, steps 16-26 are repeated.

The procedure of FIG. 10 assumes that the quality of service (QoS) of the application permits a higher data latency due to the buffering of data.

Figure 2:
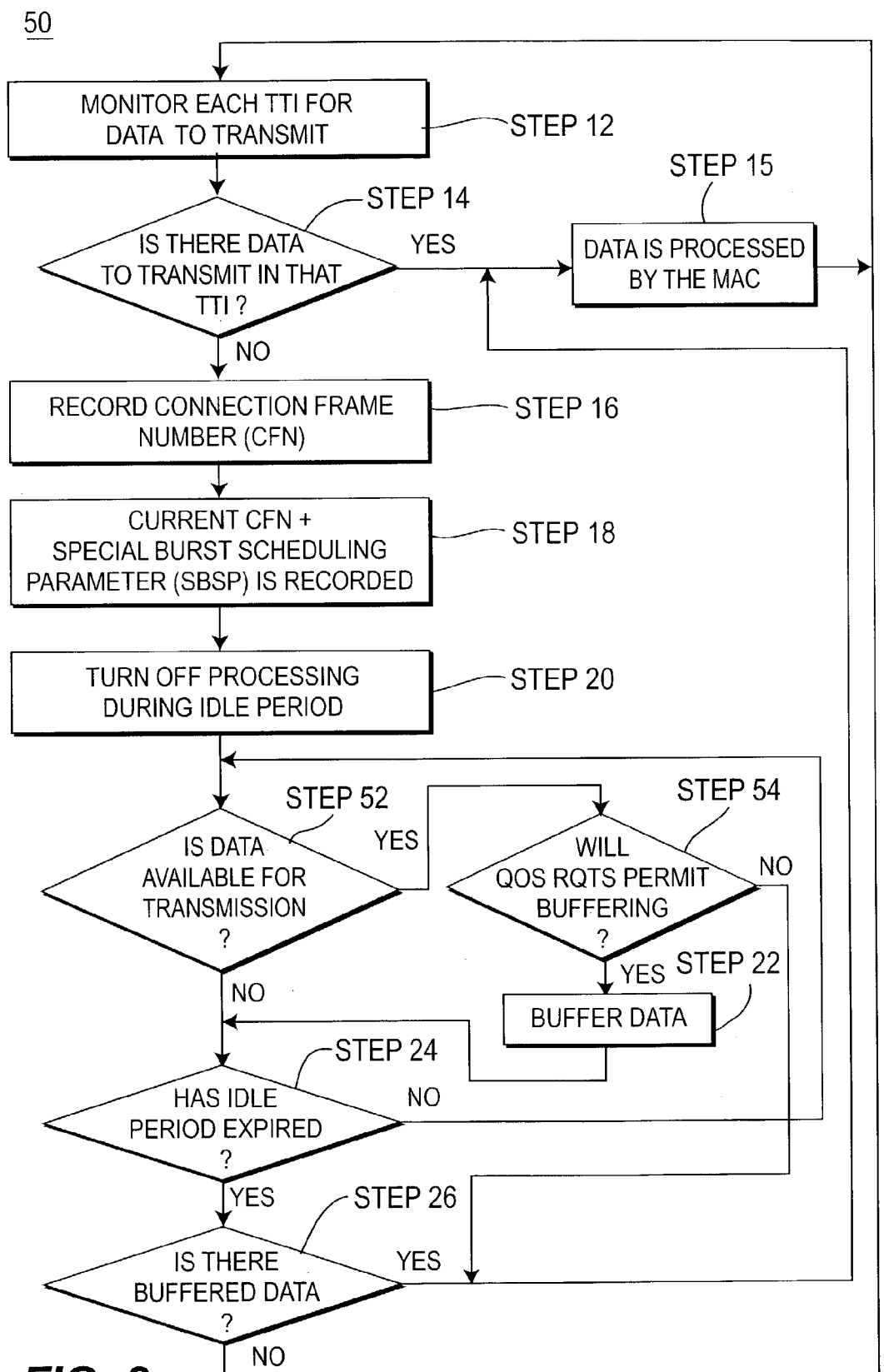
FIG. 2 is a flow diagram of an alternative procedure to the procedure of FIG. 1 that includes a Quality of Service determination prior to the buffering of data.

Referring to the flow diagram of FIG. 2, an assumption that higher data latencies are acceptable is not made. This procedure 50 is similar to the procedure 10 of FIG. 1 in that steps 12-26 are identical. However, the procedure 50 of FIG. 2 includes steps 52 and 54 which determine whether QoS requirements for that application will permit the buffering of data.

Since steps 12-26 are identical to steps 12-26 of the procedure 50 shown in FIG. 2 are identical to corresponding steps 12-26 in the procedure 10 of FIG. 1, they will not be described again with reference to FIG. 2. Referring to step 52, the UTRAN MAC determines whether data is available for transmission. If it has been determined (step 52) that no data is available for transmission, steps 2426 are carried out as hereinbefore explained. However, if it has been determined (step 52) that data has been received, the UTRAN MAC determines whether the QoS requirements permit buffering (step 54). If not, the data is immediately released for transmission (step 14). If it has been determined (step 54) that QoS requirements permit buffering, the data remains in the RLC (step 22) and steps 2426 as described hereinbefore are performed.

As those of skill in the art would appreciate, the procedures 10, 50 of FIGS. 1 and 2 respectfully permit the UTRAN MAC to restrict transmission scheduling and processing of data to time intervals separated by SBSP frames. Specifically, the initiation of data transmission would only occur in frames corresponding to when an SB would be transmitted if no data were buffered. A UE that is aware, or becomes aware, of the SBSP and this process implemented by the UTRAN MAC can remain off during the SBSP−1 frames between the anticipated arrival time of an SB without the risk of missing transmitted data. That is, at the anticipated arrival time of the SB, either an SB or data will be received. The ability of a UE to turn off for SBSP−1 out of every SBSP frames during full DTX represents a significant power savings.

In general, a UE is not aware of either the SBSP or whether the UTRAN MAC implements the procedures 10, 50 as shown in FIGS. 1 and 2, respectively. In such a case, for power savings in the UE to be achieved, the UE must determine or "learn" several pieces of information in order to coordinate with the UTRAN MAC transmission scheduling. These pieces of information are (1) the SBSP; and (2) whether or not the UTRAN MAC schedules idle downlink data periods to correspond to the SBSP.

The SBSP is a configurable parameter known only to the UTRAN. Accordingly, referring to FIG. 3, a procedure 30 for the UE to learn the SBSP is shown. At step 32, the procedure 30 is commenced by reading the TFCI at the beginning of the shortest TTI among TrCHs in the CCTrCH. As mentioned previously, a 0-valued TFCI indicates an SB which indicates the start of full DTX. If the TFCI does not indicate an SB (step 33), the data for that TTI is processed (step 34), and the procedure repeats at the beginning of the next TTI. If the TFCI indicates an SB, then the CCTrCH is in full DTX and a timing value is initialized or the current CFN is recorded (step 35). The timing value is incremented by the duration of the TTI (step 38) and the TFCI is read at that next TTI (step 39). If it is determined (step 40) that an SB has been received, the timing value, (or the difference between the current CFN and the CFN recorded in step 35), is stored as the SBSP (step 41). If it is determined (step 40) that an SB has not been received the procedure 30 returns to step 38 since the receiver assumes the CCTrCH is still in full DTX but the SBSP has not been ascertained. As a result of this procedure 30, one sample SBSP will be determined.

It should be noted that steps 35-41 can be repeated to store several timing values of step 41 in memory. Since TFCI reception will not always produce an accurate TFCI value, SB detection may produce false positive and false negative results. Therefore, a threshold number of detected SBSP values may be required before the UE is confident that the SBSP has been determined. For example, in one embodiment, the UE may require five (5) iterations of steps 35-41, (i.e. five (5) stored values that are equivalent) prior to declaring a determination of the SBSP. Of course, this is a configurable parameter that may be increased or decreased as desired by the application.

Once the SBSP has been determined, the UE may now use the SBSP to determine whether or not the UTRAN MAC, following any TTI with no data and a SB is transmitted, schedules the transmission of data upon an SBSP boundary.

Figure 4:
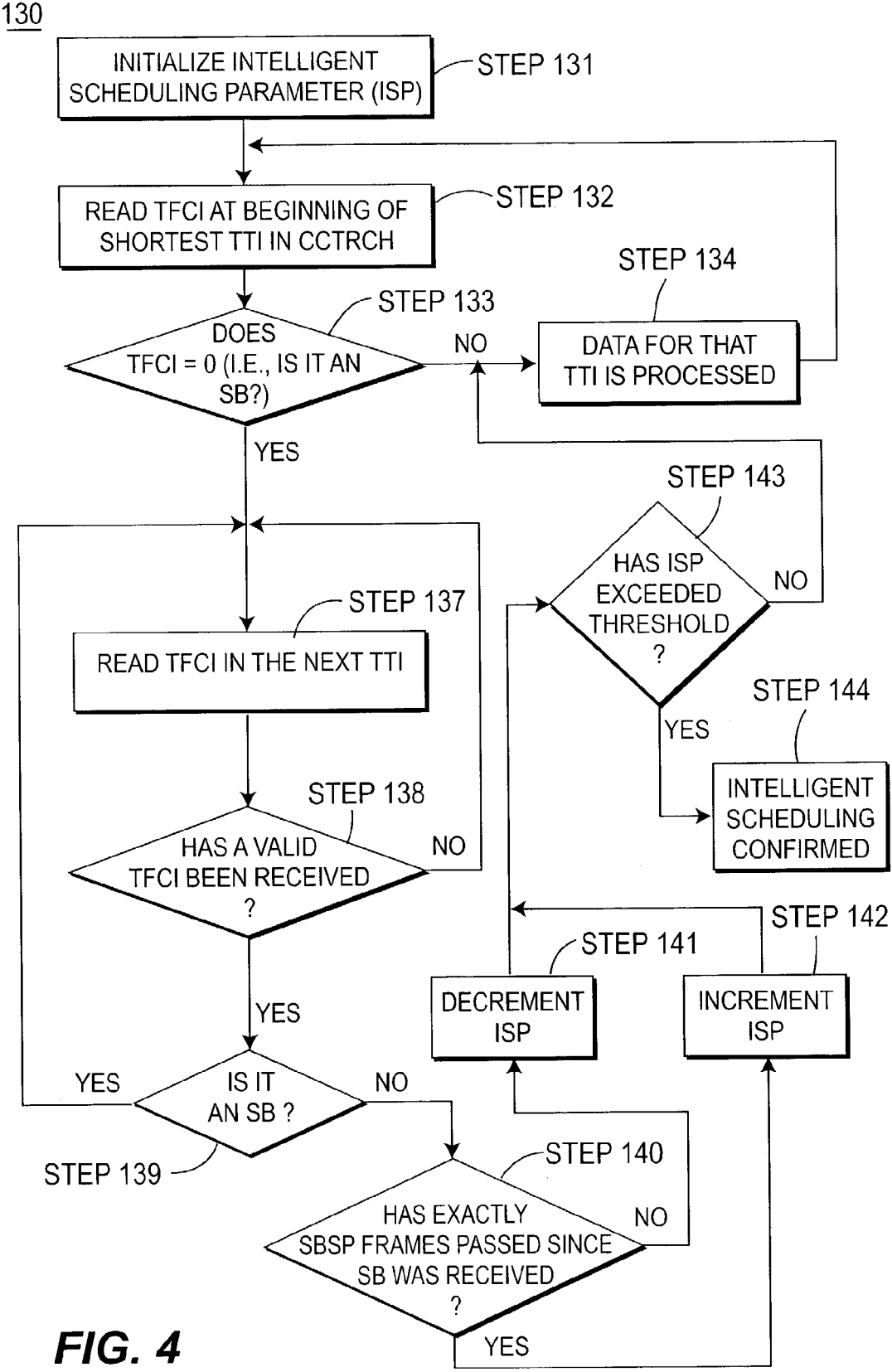
FIG. 4 is a flow diagram of a procedure a UE to learn whether the UTRAN MAC, following any TTI with no data and an SB, schedules data for transmission at the SBSP boundary.

Referring to FIG. 4, a first alternative procedure 130 for the UE to learn whether the UTRAN MAC, following any TTI with no data and a SB is transmitted, schedules data for transmission at the SBSP boundary is shown. At step 131, the procedure 130 is commenced by initializing an intelligent scheduling parameter (ISP). As will be described hereinafter, the ISP is an indicator that is used to determine the degree of correlation between the receipt of data and the anticipated arrival time of an SP based on the SBSP. The TFCI is then read at the beginning of the shortest TTI among TrCHs in the CCTrCH. If the TFCI does not indicate an SB (step 133), the receiver is not in full DTX. Accordingly, the data for that TTI is processed (step 134) and the procedure 130 repeats at the beginning of the next TTI.

If the TFCI indicates a special burst (step 133), then the CCTrCH is in full DTX. In the next TTI the receiver reads the TFCI (step 137). If a determination (step 138) is made that a valid TFCI has not been received, the procedure 130 returns to step 137. However, if a valid TFCI has been received then the receiver determines (step 139) whether or not the valid TFCI is an SB. If so, the procedure 130 returns to step 137.

If the receiver determines in step 139 that the valid TFCI is not an SB, it indicates that the transmission of data has recommenced. Accordingly, a determination (step 140) is then made as to whether the valid TFCI coincides with the anticipated arrival time of an SB; that is, exactly SBSP frames since the previous reception of an SB. If so, the ISP is incremented (step 142); and if not, the ISP is decremented (step 141). At step 143, it is determined whether the ISP has exceeded a predetermined threshold. For example, if the predetermined threshold is sent at five (5), it would indicate that the recommencement of the transmission of data after full DTX occurred five (5) times more than it did not occur.

It should be noted that the ISP is reset (and the SBSP is re-learned) upon certain events such as handover, or any other event that would cause the UE to affiliate with a cell with a different SBSP, or one that is not using the intelligent scheduling.

If it has been determined that the ISP threshold has not been exceeded, processing of the data for that TTI is performed (step 134). However, if it has been determined (step 143) that the ISP has exceeded the threshold, intelligent scheduling on behalf of the UTRAN MAC is confirmed (step 144), and the data for that TTI is processed (step 134).

An alternative, to the procedure shown in FIG. 4 is to determine a number of sequential full DTX periods that end on a multiple of SBSP relative to the start of full DTX. For example, in the procedure 30 shown in FIG. 3 it was described that a threshold number of detected SBSP values may be required before the UE is confident that the SBSP has been determined. This process may take several full DTX periods, and during these DTX periods the end of full DTX can be checked if it is upon a SBSP boundary. If it is, the counter is incremented; and if not, the counter is cleared or decremented. Accordingly, it is possible for the UE to process both methods 30 and 130, or an equivalent alternative simultaneously.

Figure 3:
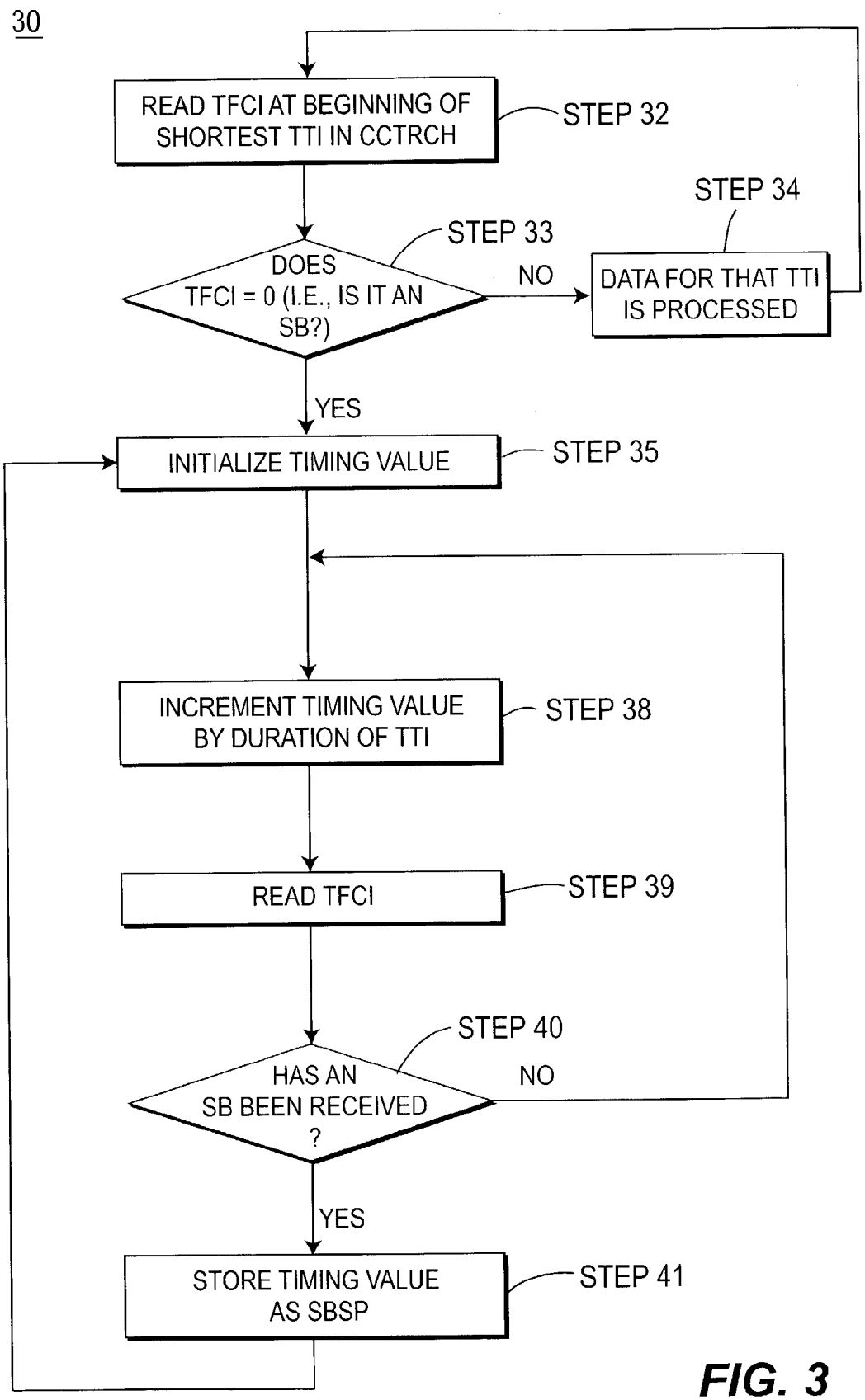
FIG. 3 is a flow diagram of a procedure for a UE to learn the SBSP.

If, as a result of the procedure 30 shown in FIG. 3 and the procedure 130 shown in FIG. 4, the UE has concluded that the UTRAN MAC has implemented intelligent scheduling, the UE can be confident that when the receiver enters full DTX, it does not have to energize the receiver processes during the SBSP−1 frames between the anticipated arrival time of SBs. This process results in reduction in UE processing and a corresponding reduction in power savings.

Although the procedure 130 shown in FIG. 4 permits the UE to determine whether or not the UTRAN MAC intelligently schedules transmission of data after full DTX, the UE can still achieve power savings even if it does not know if the UTRAN MAC schedules the recommencement of transmission of data after the full DTX upon SBSP boundaries.

Figure 5:
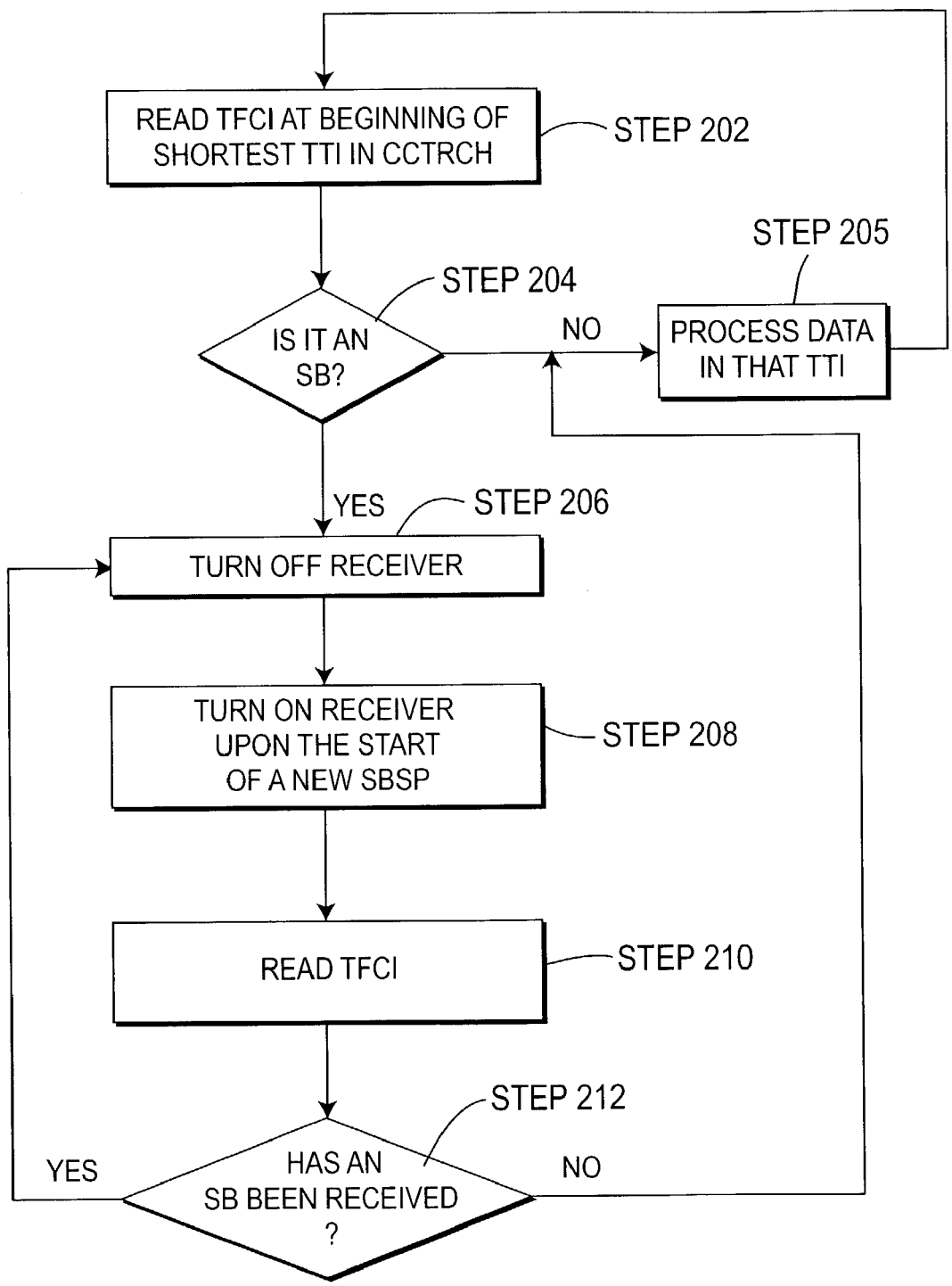
FIG. 5 is a flow diagram of a simplified procedure for power savings during full DTX in the downlink.

Referring to FIG. 5, a simplified procedure 200 for power savings during full DTX in the downlink is shown. In advance of this procedure 200, procedure 30 shown in FIG. 3 has been applied to determine the SBSP. The procedure 200 is commenced as the TFCI at the beginning of the shortest TTI among TrCHs in the CCTrCH is read (step 202). It is then determined whether the TTI is an SB (step 204). If not, data has been received and the data in that TTI is then processed (step 205) and the procedure 200 is then commenced.

If the determination (step 204) finds that the TFCI is an SB, the receiver processes are turned off (step 206). The receiver processes are then turned on SBSP−1 frames later (step 208). The TFCI is then read (step 210) and a determination (step 212) is made whether a valid TFCI has been received. If an SB has been received, the receiver processes are, once again, turned off (step 206) and steps 206-212 are repeated. However, if the determination (step 212) finds that a valid TFCI has been received, the procedure 200 returns to step 204.

Although the procedure 200 shown in FIG. 5 involves much less processing, and greater power savings than the procedure 130 shown in FIG. 4, the drawback is that this procedure can result in the loss of data if the UTRAN MAC does not intelligently schedule data upon a SBSP boundary. Thus, a trade off of power savings versus performance is made.

It should also be noted that although the procedure 200 shown in FIG. 5 does not require the UE to determine whether or not the UTRAN MAC intelligently schedules data, nonetheless, the UE must still implement the procedure 30 shown in FIG. 3 for determining the SBSP in order to implement the simplified procedure 200 shown in FIG. 5.

Figure 6:
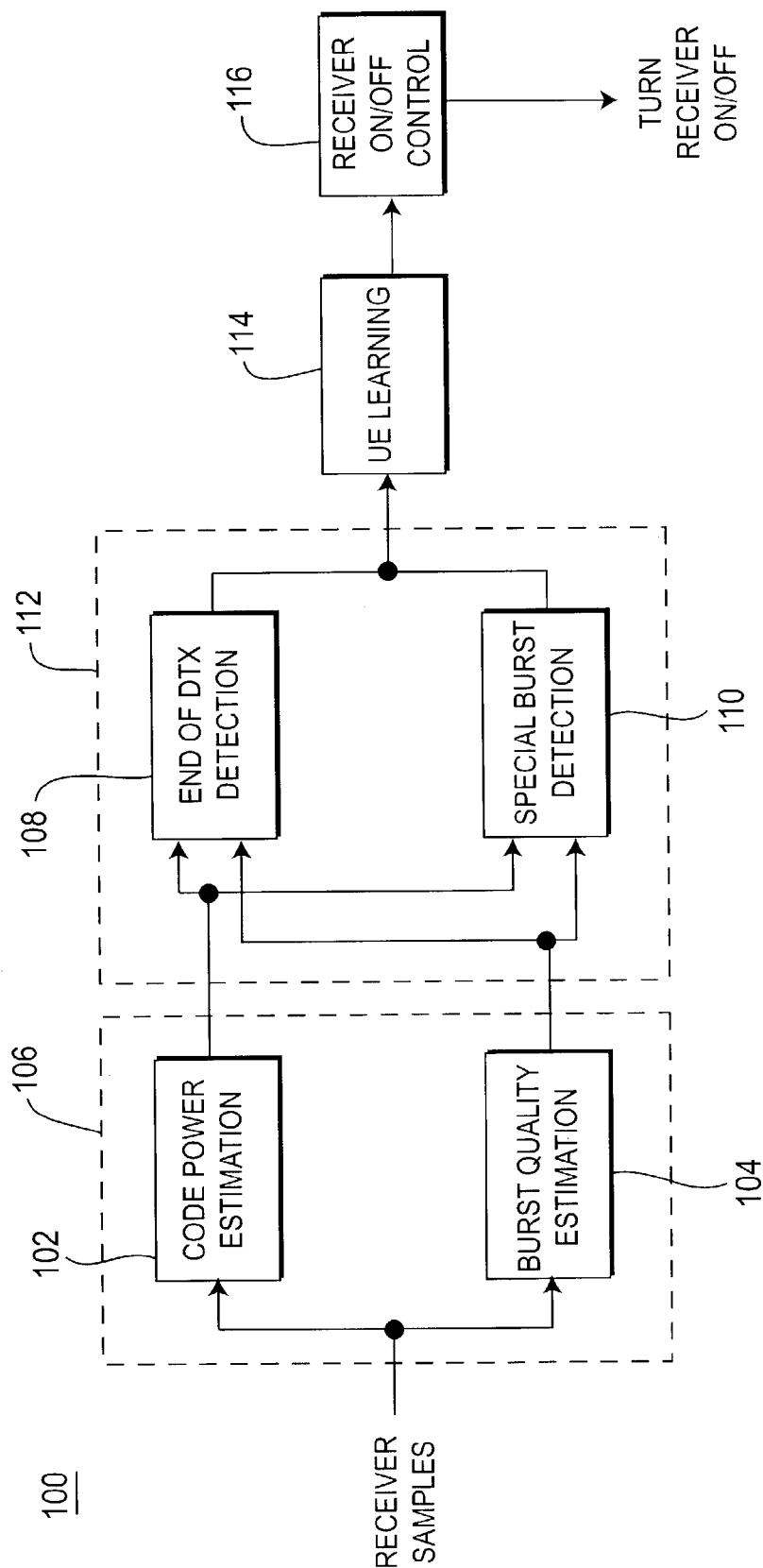
FIG. 6 is a block diagram of a system made in accordance with the present invention.

Referring to FIG. 6, a system 100 in accordance with the present invention is shown. The system 100 includes a code power estimation unit 102, a burst quality estimation unit 104, an end of DTX detection unit 108, a special burst detection unit 110, a UE learning unit 114 and a receiver on/off control unit 116. Although the code power estimation unit 102 and the burst quality estimation unit 104 are shown as separate entities, these could easily be combined, as would be appreciated by those of skill in the art, into a single preprocessing unit 106. Likewise, although the end of DTX detection unit 108 and the special burst detection unit 110 are shown as separate entities, they may be combined into a single detection unit 112 which detects and interprets the information within the TFCI fields.

The code power estimation unit 102 estimates the power of each received code. The burst quality estimation unit 104 estimates a quality metric on the received burst, for example, the signal-to-noise ratio. Together, the code power estimation unit 102 and the burst quality estimation unit 104 perform preprocessing of the received signal, which helps the end of DTX detection unit 108 and the special burst detection unit 110 determine whether or not a valid TFCI has been received. Essentially, the code power estimation unit 102 and the burst quality estimation unit 104 provide a first threshold that the received signal must overcome. This helps the system 100 determine a valid burst from other energy that is received by the receiver. This also helps to avoid the erroneous detection of received energy, (that is not a valid TFCI) as a valid TFCI. Such an erroneous detection could cause the receiver to turn on unnecessarily and ultimately results in erroneous data, thus increasing the amount of processing required, wasting power, and erroneously increasing the BLER which results in unnecessary increases in transmit power.

The end of DTX detection unit 108 interprets the TFCI bits to identify when data is being received.

The special burst detection unit 110 determines whether or not an SB has been received, thereby signaling the commencement of full DTX. As shown, the output of the end of DTX detection unit 108 and the special burst detection unit 110 are input into the UE learning unit 114.

The end of DTX detection unit 108 detects the presence of a valid TFCI that is not an SB, indicating the beginning of receipt of valid data and the end of DTX. This indication is forwarded to the UE learning unit 114. Likewise, if the special burst detection unit 110 detects the presence of an SB, indicating full DTX has commenced, the UE learning unit 114 is notified.

The receiver on/off control 116 turns the receiver off as directed by the UE learning unit 114. It should be noted that although the UE learning unit 114 and the receiver on/off control 116 have been described as separate units, the receiver on/off control 116 may be incorporated into the UE learning unit 114. Alternatively, the receiver on/off control 116 may be eliminated and the UE learning unit 114 may perform the receiver control functions. In general, all of the elements described in FIG. 6 are functional units, and their description herein as separate and distinct units was provided for ease of understanding by way of example. These functional blocks should not be understood by way of limitation. For example, all of these functions may be implemented in a single programmable controller if desired.

The UE learning unit 114 receives the inputs from both the end of DTX detection unit 108 and the special burst detection unit 110 and processes them in accordance with the procedures 30, 130, 200 explained hereinbefore with reference to FIGS. 3, 4 and 5, respectively.

If the receiver has entered DTX, it will turn on at the next TTI in an attempt to read a TFCI. The code power estimation unit 102 and the burst quality estimation unit 104 provide a threshold that the signal must overcome to declare that a signal was received. If the threshold is exceeded, then the end of DTX detection unit 108 and special burst detection unit 110 determine whether the TFCI is valid, (i.e. corresponds to a value in the TFCS), or whether the TFCI equals zero, (indicating an SB). If the threshold is not exceeded, TFCI does not equal a valid value, or the TFCI equals zero (indicating an SB and continuation of full DTX), then the receiver on/off control 116, is notified to turn the receiver off for the next SBSP−1 frames. If the threshold is exceeded and the TFCI equals a valid non-zero value, then the UE concludes full DTX has ended and continues processing received data in this frame and subsequent frames.

The present invention is compatible with the current wideband and narrowband TDD standards and TD-SCDMA. It provides the capability to save UE power by turning off all receiver processing during (SBSP−1) frames after the reception of an SB.

What is claimed is:

1. A method for managing the transmission of data during discontinuous transmission (DTX) in a time division duplex (TDD) communication mode, the method comprising:
   receiving a transport format combination index (TFCI) for a coded composite transport channel (CCTrCH) at a wireless transmit/receive unit (WTRU);
   determining whether the received TFCI is a special burst (SB);
   on a condition that the received TFCI is a SB, turning off receiver processing, and turning on the receiving processing at the start of a predetermined duration, the predetermined duration equal to a plurality of transmission time intervals (TTIs), wherein the predetermined duration is determined iteratively by initializing a timing value in response to the TFCI indicating a SB, incrementing the timing value by a duration of TTIs until a next TFCI indication of an SB is received, and storing the duration of TTIs as the predetermined duration;
   on a condition that the received TFCI is not a SB, processing data associated with the TFCI; and
   reading a next TFCI.

2. The method of claim 1 wherein the determining is repeated for the next TFCI.

3. An apparatus configured to save power during discontinuous transmission (DTX), the apparatus comprising:
   a preprocessing unit configured to determine whether a received signal includes a valid transport format combination index (TFCI);
   a detection unit configured to read the valid TFCI to determine whether the TFCI is a special burst (SB); and
   a learning unit configured to determine when data will be transmitted, and for turning off receiver processing for all codes and timeslots that will not be used, and turning on receiver processing following a predetermined duration equal to a plurality of transmission time intervals (TTIs), where the learning unit learns the predetermined duration by initializing a timing value in response to the TFCI indicating a SB, incrementing the timing value by a duration of TTIs until a next TFCI indication of an SB is received, and storing the duration of TTIs as the predetermined duration.

4. The apparatus of claim 3 wherein the preprocessing unit comprises a code power estimation unit configured to estimate the power of the received signal.

5. The apparatus of claim 4 wherein the processing unit further comprises a burst quality estimation unit configured to estimate a quality of the received signal.

6. The apparatus of claim 3 wherein the detection unit comprises an end of DTX detection unit configured to read the valid TFCI and identify whether data is being transmitted.

7. The apparatus of claim 6 wherein the detection unit further comprises a SB detection unit configured to read the valid TFCI and identifying whether it is a SB indicating full DTX.

8. The apparatus of claim 3, wherein the learning unit:
   reads each TFCI received, and on a condition that the received TFCI is not a SB, sends data for processing;
   on a condition that the read TFCI is a not SB, the learning unit increments the timing value by the TTI; and
   on a condition that the read TFCI is a SB, the timing value is stored as a Special Burst Storage Parameter (SBSP) and the SBSP is set as the predetermined duration.

* * * * *